United States Patent [19]

Hiramatsu et al.

[11] Patent Number: 4,980,521
[45] Date of Patent: * Dec. 25, 1990

[54] POWER TRANSMISSION APPARATUS

[75] Inventors: Takeo Hiramatsu, Kyoto; Kenjiro Fujita, Shiga; Yoshimasa Nagayoshi, Kyoto; Satoshi Kawai; Yoshiaki Hamasaki, both of Osaka, all of Japan

[73] Assignees: Mitsubishi Jidosha Kogyo Kabushiki Kaisha, Tokyo; Koyo Seiko, Co. Ltd., Osaka, both of Japan

[*] Notice: The portion of the term of this patent subsequent to May 16, 2006 has been disclaimed.

[21] Appl. No.: 313,523

[22] Filed: Feb. 22, 1989

[30] Foreign Application Priority Data

Mar. 30, 1988 [JP] Japan .................................. 63-77895

[51] Int. Cl.$^5$ ............................................ F16D 31/02
[52] U.S. Cl. .................................. 192/60; 192/103 F
[58] Field of Search ...................... 192/60, 58 B, 82 T, 192/103 F; 184/233, 248

[56] References Cited

U.S. PATENT DOCUMENTS

| | | | |
|---|---|---|---|
| 1,105,792 | 8/1914 | Jessen | 192/60 |
| 2,132,631 | 8/1937 | Jones | 192/60 |
| 2,244,509 | 6/1941 | Ajero | 192/60 |
| 2,498,801 | 2/1950 | Fraser | 192/60 |
| 4,096,712 | 6/1978 | Webb | 192/82 T |
| 4,469,012 | 9/1984 | Bigo et al. | 192/60 |
| 4,562,897 | 1/1986 | Renneker | 192/58 B |
| 4,703,842 | 11/1987 | Leinfellner et al. | 192/58 B |
| 4,727,966 | 3/1988 | Hiramatsu | 74/711 |
| 4,727,969 | 3/1988 | Hayashi et al. | 192/58 B |
| 4,821,604 | 4/1989 | Asano | 192/103 F |
| 4,829,769 | 5/1989 | Hiramatsu | 192/60 |
| 4,846,299 | 7/1989 | Wiese et al. | 180/248 |

FOREIGN PATENT DOCUMENTS

| | | | |
|---|---|---|---|
| 0235102 | 1/1987 | European Pat. Off. | |
| 871861 | 2/1953 | Fed. Rep. of Germany | 192/60 |
| 623679 | 8/1961 | Italy | 192/60 |
| 342598 | 2/1931 | United Kingdom | 192/60 |
| 719076 | 11/1954 | United Kingdom | |
| 1498061 | 1/1978 | United Kingdom | |
| 1509374 | 5/1978 | United Kingdom | |
| 1551009 | 8/1979 | United Kingdom | |
| 84/04789 | 12/1984 | World Int. Prop. O. | |

Primary Examiner—Rodney H. Bonck
Assistant Examiner—Nicholas Whitelaw
Attorney, Agent, or Firm—Wegner, Cantor, Mueller & Player

[57] ABSTRACT

A power transmission apparatus suitable for use with a four wheel drive apparatus of an automobile which can prevent spouting of working fluid through a sealing portion or the like and introduction of external air into the apparatus through a sealing portion. The apparatus comprises a hydraulic transmission coupling mechanism of the vane pump type connected to a pair of shafts to transmit driving force between the shafts and having a pump chamber formed therein. A tank is provided in an integral relationship with the coupling mechanism and accommodates working fluid in an enclosed condition therein. A volume variation absorbing mechanism is provided near an axis of rotation of the coupling mechanism for absorbing a variation in volume of the working fluid in the pump chamber.

4 Claims, 6 Drawing Sheets

POWER TRANSMISSION APPARATUS

BACKGROUND OF THE INVENTION

1. Field of the Invention

This invention relates to a power transmission apparatus of the hydraulic pump type for transmitting torque in accordance with a hydraulic pressure which is produced in response to a difference in rotational speed between two rotary shafts, and more particularly to a power transmission apparatus of the type mentioned which is suitable for use with a four wheel drive apparatus of an automobile.

2. Description of the Prior Art

In a four wheel drive apparatus, for example, wherein front and rear wheels are driven commonly by a single engine, the front and rear wheels sometimes rotate at different rotational speeds because they have somewhat different effective rotational radii or because rolling routes are different not only between the left and right wheels but also between the front and rear wheels when the automobile makes a turn or the like. Such a difference in rotational speed between the front and rear wheels will cause an undesirable tight corner braking phenomenon.

Automobiles of the so-called full time four wheel drive type have been developed, therefore, which include a power transmission apparatus interposed between front and rear wheels for preventing occurrence of a tight corner braking phenomenon and for distributing driving force of an engine to the front and rear wheels in response to a difference in rotational speed between the front and rear wheels.

Such a power transmission apparatus either includes a differential gear (center differential a gear interposed between front and rear wheels for absorbing a difference in rotational speed between the front and rear wheels and a differential locking mechanism for looking operation of the front or rear wheels (or a viscous coupling for limiting operation of the front or rear wheels), or singly includes a viscous coupling.

A power transmission apparatus of the type which includes a center differential gear is complicated in structure because such a center differential gear cannot readily be reduced in size and will cause an increase in weight of a car body and also in production cost and besides a differential looking mechanism, a viscous coupling or a like mechanism for assuring the four wheel drivability is required To the contrary, a power transmission apparatus of the type which singly includes a viscous coupling has such a torque transmission characteristic that the torque transmission gradually decreases as the difference in rotational speed between front and rear wheels increases. Accordingly, when the automobile travels on a road having a very low coefficient of friction such as, for example, a sandy road a muddy place or a snowy or slushy road, if the difference in rotational speed between the front and rear wheels is not sufficiently great, torque cannot be transmitted to the driven side wheels, and consequently, there is the possibility that a slip may occur at the driving side wheels.

A novel power transmission apparatus has been thus proposed and is disclosed, for example in British patent No. 2,164,522 and U.S. Pat. No. 4 676,336 wherein torque is suitably transmitted from the front wheel side to the rear wheel side by means of a hydraulic pressure mechanism in place of such a center differential gear and a viscous coupling as described above.

The power transmission apparatus includes a hydraulic pump interposed, for example, in a driving system which interconnects front and rear wheels. The hydraulic pump includes a rotor connected to be rotated in response to one of front and rear wheels, and a casing connected to be rotated in response to the other of the front and rear wheels. The rotor is accommodated in a coaxial relationship in the casing such that the former may rotate relative to the latter at a rotational speed corresponding to a difference in rotational speed which occurs between the front and rear wheels. The hydraulic pump thus accomplishes transmission of driving force between the rotor and the casing thereof, that is between the front and rear wheels of the automobile by way of a hydraulic pressure which is produced in the hydraulic pump in response to relative rotation between the rotor and the casing. The power transmission apparatus has excellent features, comparing with a power transmission apparatus which employs a viscous coupling, that great driving force can be transmitted with a compact construction and that occurrence of the tight corner braking phenomenon can be restricted significantly.

With the conventional power transmission apparatus described above, however, mission oil is employed as working oil because the apparatus is installed in the inside of a transmission case. Such mission oil frequently contains iron powder produced in the inside of the transmission case or some other dust and so on, which has a bad influence on the power transmission apparatus.

It may thus seem recommendable to provide a power transmission apparatus independently of a transmission case and use particular oil exclusively as working oil. Where the working oil is enclosed in the apparatus, the power transmission apparatus can be formed as a unitary block and can thus be mounted at various locations.

With such a power transmission apparatus as described just above, however, the working oil presents a wide range of variation in temperature whether it is operating or at rest, and the temperature of the working oil is varied also by a temperature of the external air. Such temperature variation will cause a variation in volume of the working oil. For example, when the temperature rises, he working oil is expanded to raise the pressure of the working oil, but on the contrary when the temperature drops, the working oil is contracted to lower the working oil pressure.

Accordingly, where the working oil is enclosed in the inside of the apparatus, a rise of temperature of the working oil to a high temperature may cause spouting of the working oil through a sealing portion or the like of the apparatus, and a drop of temperature to a low temperature may cause the external air to be introduced into the apparatus through a sealing portion or the like of the apparatus, which may lead to a trouble of the apparatus.

Therefore, some means is required for permitting a variation in pressure of working oil.

Such means for permitting a pressure variation of enclosed working oil is disclosed, for example, in U.S Pat. No. 3,393,583.

The disclosed apparatus is designed to permit a pressure variation involved in variation in volume such as expansion or contraction of working oil enclosed in a differential gear of an automobile. More particularly, it is proposed to provide a diaphragm or a pneumatic piston in a working oil chamber.

By the way, when the apparatus is operating, a rotary element in a working oil chamber such as a shaft or a gear wheel, or else, in such a power transmission apparatus as described just above, the entire apparatus rotates to provide centrifugal force to the working oil. Consequently, the pressure of the working oil rises near an outer periphery of the inside of the apparatus but lowers at or near an axis of rotation of the apparatus.

In the apparatus disclosed in U.S. Pat. No 3,393,583 mentioned above, however, since the volume variation permitting means is located near an outer periphery of a working oil chamber, it will act in such a manner as to absorb the oil pressure raised by centrifugal force. Consequently, if the volume of the working oil is varied by a rise of the oil temperature after then, the variation in volume may not fully be absorbed by the volume variation permitting means. Besides, it is hard to compensate for a drop of pressure at or near the axis of rotation.

Thus, for a power transmission apparatus wherein torque is transmitted by way of a hydraulic pressure which is caused by a difference in rotational speed between two rotary shafts, it is a subject how to prevent reduction in pressure of working fluid at or near an axis of rotation while a variation in volume of the working oil caused by a variation in temperature and so on is fully absorbed.

SUMMARY OF THE INVENTION

It is an object of the present invention to provide a power transmission apparatus which can prevent spouting of working fluid through a sealing portion or the like and introduction of external air into the apparatus through a sealing portion.

In order to attain the object, according to the present invention, there is provided a power transmission apparatus which comprises a hydraulic transmission coupling mechanism of the vane pump type including a cam ring connected to a first rotary shaft, the hydraulic transmission coupling mechanism further including a rotor connected to a second rotary shaft and accommodated for rotation in the cam ring to define a pump chamber therebetween, the hydraulic transmission coupling mechanism further including a plurality of vanes mounted on an outer peripheral wall of the rotor for slidably contacting with an inner peripheral wall of the cam ring to partition the pump chamber into a discharge side chamber and a suction side chamber, the pump chamber containing working fluid therein, the power transmission apparatus being designed to transmit driving force between the first and second rotary shafts in accordance with a pressure of the working fluid in the pump chamber which is produced in response to rotation of the first and second rotary shafts relative to each other, a tank provided in an integral relationship with the hydraulic transmission coupling mechanism for accommodating the working fluid in an enclosed condition therein, and a volume variation absorbing mechanism provided near an axis of rotation of the hydraulic transmission coupling mechanism for absorbing a variation in volume of the working fluid.

With the power transmission apparatus of the present invention, since the tank for accommodating the working fluid in an enclosed condition is provided in an integral relationship with the apparatus and the volume variation absorbing mechanism for absorbing a variation in volume of the working fluid is provided near the axis of rotation of the apparatus, the apparatus can be formed as a unitary block, and accordingly, the apparatus can be readily incorporated in various power transmitting mechanisms such as a propeller shaft. Besides, since the working fluid can be used exclusively for the power transmission apparatus and is not used for any other apparatus, deterioration of the working oil is prevented, and the life of the apparatus is improved Further, the volume variation absorbing mechanism absorbs, at a location near the axis of rotation, a variation in volume of the working fluid caused by a variation in temperature without being influenced by a rise in pressure of the working fluid at an outer peripheral location which is caused by centrifugal force during rotation of the apparatus. To the contrary, when the pressure is lowered at or near the axis of rotation, the volume variation absorbing mechanism operates so as to decrease the volume of the tank. Consequently, the pressure of the working fluid is adjusted within a predetermined fixed pressure range in the tank and reduction in pressure of the working fluid at or near the axis of rotation is controlled. Accordingly, such disadvantages are eliminated that the working fluid is spouted through a sealing portion or the like of the apparatus when the temperature is high and external air is introduced into the apparatus through a sealing portion or the like when the temperature is low, and the apparatus can operate with certainty.

The above and other objects, features and advantages of the present invention will become apparent from the following description and the appended claims, taken in conjunction with the accompanying drawings in which like reference characters designate like or corresponding parts through the several views.

DESCRIPTION OF THE PREFERRED EMBODIMENTS

Figure 1:
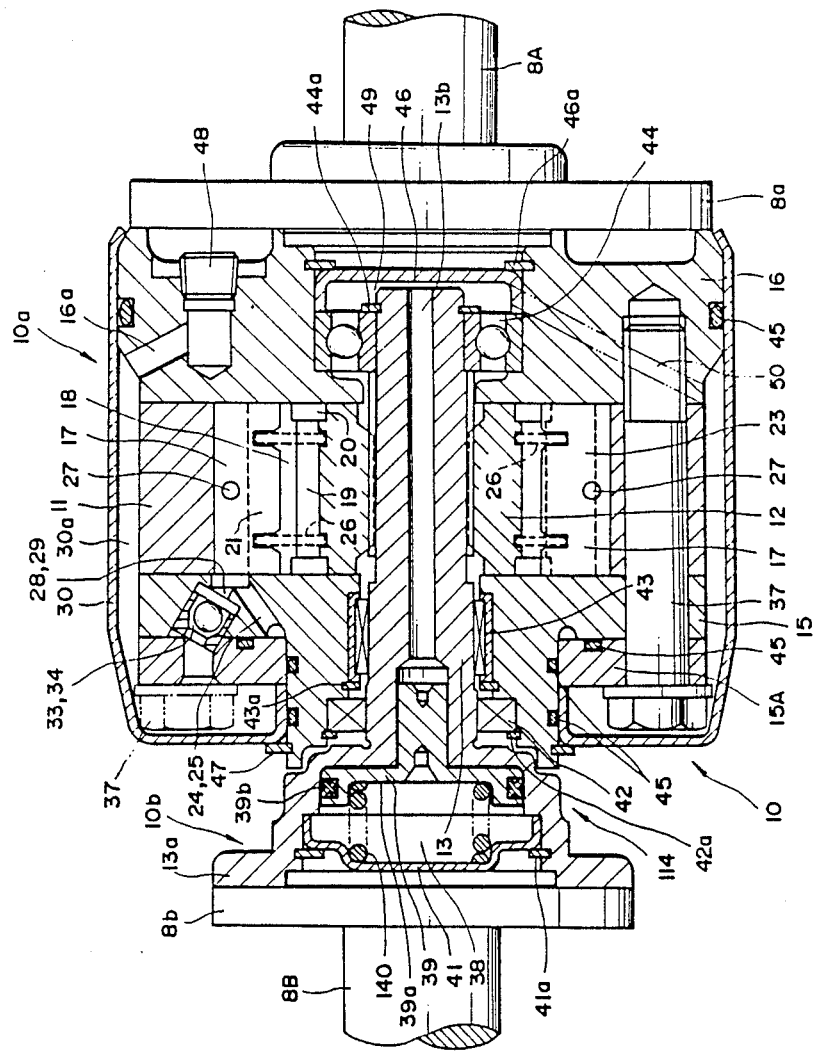
FIG. 1 is a vertical sectional view of a power transmission apparatus taken along line I—I of FIG. 2 showing a first embodiment of the present invention.

Referring first to FIG. 1, there is shown a power transmission apparatus according to a first preferred embodiment of the present invention. The power transmission apparatus is generally denoted at 10 and interposed between n first rotary shaft 8A and a second rotary shaft 8B. The power transmission apparatus includes a cam ring side section 10a mounted for integral rotation with the first rotary shaft 8A and a rotor side section 10b mounted for integral rotation with the second rotary shaft 8B.

The cam ring side section 10a includes a cam ring 11, a pair of end housings 15 and 16 coupled to the opposite ends of the cam ring 11, a spacer 15A connected to the end housing 15, and a cover member 30 mounted in such a manner as to cover the cam ring 11, end housings 15 and 16 and spacer 15A.

The spacer 16A, end housing 16, cam ring 11 and end housing 16 are coupled in an integral relationship by means of a plurality of bolts 37 which extend through those elements and are screwed in the end housing 16. Among those elements, the end housing 16 is coupled to an end flange 8a of the first rotary shaft 8A.

The cover member 30 is fitted at the opposite ends thereof on the end housings 15 and 16 and secured in position by means of a stopper ring 47. The cover member 30 thus cooperates with the cam ring 11, end housings 15 and 18, spacer 15A and so on in the inside thereof to define a tank 30a in which working oil as working fluid can be accommodated in an enclosed condition.

A seal member 45 is interposed between each suitable adjacent ones of the elements mentioned above.

An oil path 16a is perforated in the end housing 16 and communicates with the tank 30a such that working oil may be supplied into the tank 30a therethrough. After working oil is supplied into the tank 30a, the oil path 16a is closed by a tapered plug 48.

On the other hand, the rotor side section 10b of the power transmission apparatus 10 includes a rotor 12 a shaft member 13 serration-coupled to the rotor 12, and a volume variation absorbing mechanism 14 installed in an end portion of the shaft member 13. The shaft member 13 extends through the rotor 12 and is supported for rotation on the end housings 15 and 16 by means of bearings 43 and 44. The bearings 43 and 44 are secured in position to the shaft member 13 by means of stoppers 43a and 44a, respectively.

Figure 2:
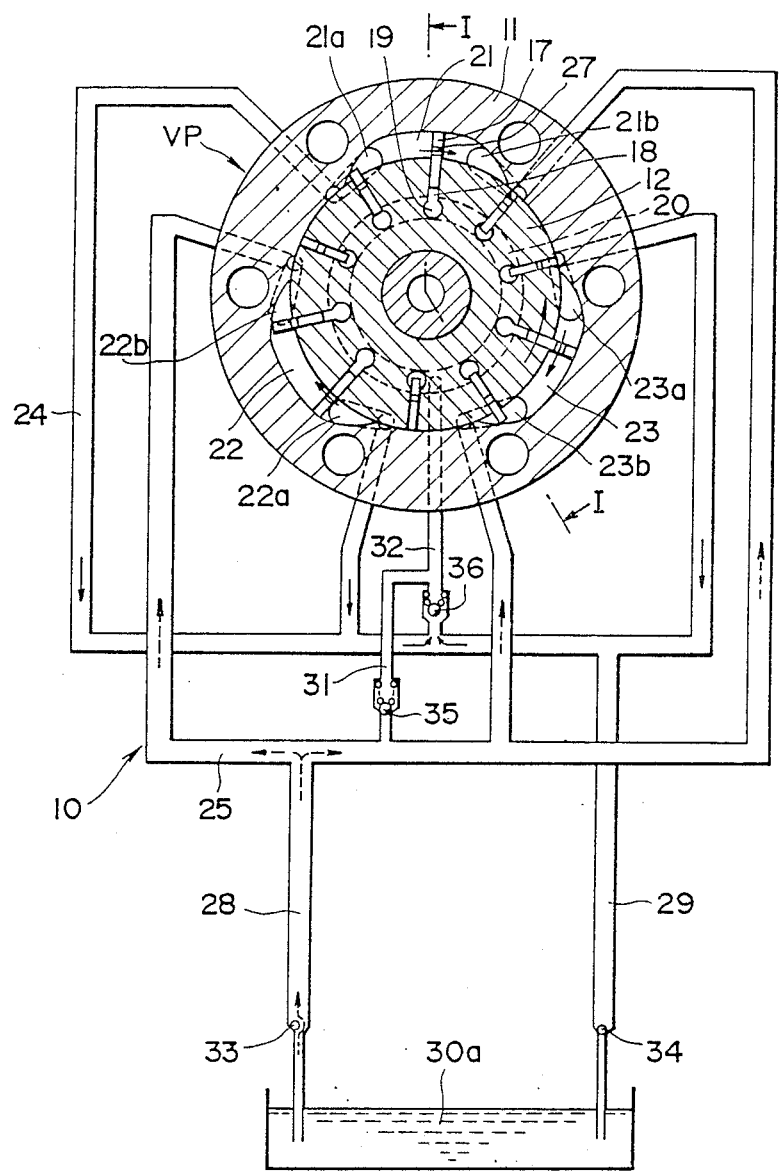
FIG. 2 is a schematic diagram showing passages of working fluid in the power transmission apparatus of FIG. 1.

Referring to FIG. 2, three pump chambers 21, 22 and 23 are formed between the cam ring 11 and an outer periphery of the rotor 12. In particular, a plurality of, three in the embodiment shown, recesses are formed in an inner wall of the cam ring 11, and the recesses are surrounded by inner walls of the end housings 15 and 16 and the outer peripheral face of the rotor 12, thereby defining the three oil chambers 21, 22 and 23 which serve as pump chambers. It is to be noted that, for convenience sake, the tank 30 and several oil paths communicating with the tank 80 are shown separated from the body in FIG. 2 in order to facilitate the understanding.

Referring to FIGS. 1 and 2, a plurality of vanes 17 are disposed in the rotor 12 and extend radially into the pump chambers 21, 22 and 23 such that each of the pump chambers 21, 22 and 23 may be partitioned into a discharging side chamber and a sucking side chamber by one of the vanes 17. The vanes 17 are mounted for back and forth movement in radial directions in radial grooves 18 formed in the rotor 12 and normally biased in the radially outward directions each by means of a pair of springs 26 so that outer ends thereof are held in sliding engagement with the inner peripheral face of the cam ring 11. Each of the vanes 17 has an orifice 27 formed at a radially outer portion thereof for establishing communication between such a discharging side chamber and a sucking side chamber of a pump chamber 21, 22 or 28 as described hereinabove.

An enlarged diameter portion 19 is formed at a base portion of each of the grooves 18 of the rotor 12, and a pair of pressure chambers 20 are formed at the opposite ends of the enlarged diameter portions 19 between the rotor 12 and the end housing 15 for communicating the enlarged diameter portions 19 with each other.

Each of the pump chambers 21, 22 and 23 has a pair of ports 21a and 21b, 22a and 22b, and 28a and 23b formed at the opposite end portions thereof.

The end housing 15 and the spacer 15A have perforated therein a first oil path 21 for establishing communication among the ports 21a, 22a and 23a of the pump chambers 21, 22 and 23, a second oil path 25 for establishing communication among the other ports 21b, 22b and 23b of the pump chambers 21, 22 and 23 and further oil paths 31 and 32 for establishing communication between the first and second oil paths 24 and 25 and the pressure chambers 20, respectively. The end housing 16 and the spacer 15A have further oil paths 28 and 29 formed therein for establishing communication between the pump chambers 21, 22 and 23 within the cam ring 11 and the tank 30a. The oil paths 28, 29 31 and 32 have check valves 33, 34, 35 and 36 interposed therein, respectively.

Referring to FIG. 1, the shaft member 13 has a flange 13a formed at an end thereof and is coupled at the flange 13a thereof to an end flange 8b of the second rotary shaft 8B. The other end of the shaft member 13 extends into a hollow bore formed in the end housing 16 and is surrounded liquid-tight by a lid member 46 which has a sealing function.

The spacing circumscribed by the lid member 46 functions as an oil chamber 49 and is communicated with a cylinder 38 which will be hereinafter described by way of a passage 13b formed in and extending between the opposite ends along an axis of the shaft member 13. The spacing is further communicated with the inside of the tank 30a by way of an oil path 50 perforated in the end housing 16. Gaps or spacings defined by the shaft member 13 and the opposite end housings 15 and 16 also function as oil chambers which are made liquid-tight at the opposite ends thereof by a seal member 12 and the lid member 48. The seal members 42 and the lid members 46 are secured in position to the shaft member 13 by means of stoppers 42a and 46a, respectively.

The cylinder 38 is formed in the flange 13a of the shaft member 13 and communicated with the oil chamber 49 by way of the passage 13b. A piston 39 is fitted for sliding movement in the cylinder 38 and normally biased rightwardly in FIG. 1 (in the direction to decrease the volume of the cylinder 38) by a compression coil spring 40 disposed in the cylinder 38 thereby constituting the volume variation absorbing mechanism 14.

In particular, a portion of the passage 13b of the shaft member 13 near the flange 13a is increased in diameter at two stages as seen in FIG. 1 to form the cylinder 38, and the piston 89 fitted in the cylinder 38 is biased toward the passage 18b by the spring 40. A retainer 41 is secured to the shaft member 13 at an open end of the cylinder 38 adjacent the flange 18a by means of a stopper ring 41a. A recess 39a is formed in an end wall of the piston 39 adjacent the cylinder 38, and the compression coil spring 40 is held between the retainer 41 and the bottom of the recess 39a of the piston 39. An annular seal member 39b is provided on an outer periphery of a greater diameter portion of the piston 39 for sealing up between an inner wall face of the cylinder 38 and the piston 39.

Working oil to be stored in the tank 30a is supplied into the tank 30a by way of the oil path 16a and accommodated in the tank 30a in an enclosed condition. While the working oil is accommodated in the tank 30a, it is pressurized to a predetermined pressure so that the piston 39 normally assumes a suitably retracted position (leftwardly moved position in FIG. 1) against the biasing force of the compression coil spring 40. In FIG. 1, the piston 39 is shown at its most advanced position with the pressure of the working oil reduced to its minimum level.

Figure 3:
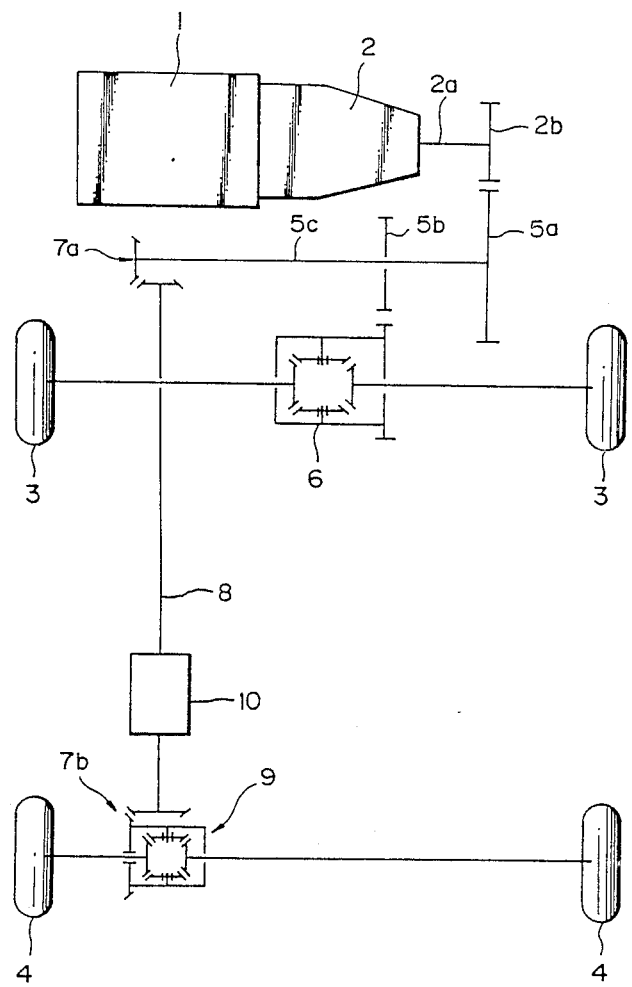
FIG. 3 is a diagrammatic illustration showing a location of an automobile at which the power transmission of FIG. 1 is mounted.

The power transmission apparatus 10 of the present invention having such a construction as described above is interposed, for example, between a front wheel side and a rear wheel side of such an automobile of the four wheel drive type as shown in FIG. 3.

In particular, referring to FIG. 8, a speed change gear 2 is connected to a transverse engine 1 of the automobile, and a driving gear wheel (or else a four-speed counter gear) 2b is mounted on an output power shaft 2a of the speed change gear 2. A pair of differential gears 6 and 9 are interposed between a pair of front wheels 3 and between a pair of rear wheels 4, respectively. The driving gear wheel 2b is held in meshing engagement with a first gear wheel 5a mounted on an intermediate shaft 5c which is connected to the differential gear 9 by way of a bevel gear mechanism 7a, a propeller shaft 8 and another bevel gear mechanism 7b. The intermediate shaft 5c is connected to the other differential gear 6 by way of a second gear wheel 5b mounted at an intermediate portion of itself.

The power transmission apparatus 10 is interposed at an intermediate location of the propeller shaft 8. The propeller shaft 8 consists of a front wheel side portion and a rear wheel side portion located on the front and rear wheel sides, respectively, with respect to the power transmission apparatus 10 (upper and lower portions in FIG. S), and one of the portions should be coupled as the first rotary shaft 8A to the cam ring 11 while the other should be coupled as the second rotary shaft 8B to the rotor 12. Here, however, the front wheel side portion of the propeller shaft 8 is taken as the second rotary shaft 8B while the rear wheel side portion is taken as the first rotary shaft 8A.

Since the power transmission apparatus 10 according to the first preferred embodiment of the present invention has such a construction as described above, if any difference in rotational speed occurs between the first rotary shaft 8A and the second rotary shaft 8B, the rotor 12 will be rotated relative to the cam ring 11, and thereupon, working oil in the pump chambers 21, 22 and 23 is actuated by the associated vanes 17.

Referring back to FIG. 2, if the rotor 12 is rotated, for example, in the counterclockwise direction relative to the cam ring 11, the associated vanes 17 pressurize the working oil in the pump chambers 21, 22 and 23. Consequently, the ports 21a, 22a and 23a which are incidentally positioned forwardly of the vanes 17 act as discharge ports while the other ports 21b, 22b and 23b which are incidentally positioned rearwardly of the vanes 17 act as suction ports.

Due to a pumping action of the vanes 17, in the pump chambers 21, 22 and 28, part of the working oil flows from the discharging side chamber portions into the sucking side chamber portions through the orifices 27 of the vanes 17. Meanwhile, some other part of the working oil is discharged into the first oil path 24 from the ports 21a, 22a and 23a now serving as the discharge ports and then supplied into the pressure chamber 20 by way of the oil path 32 to urge the vanes 17 to contact under predetermined force with the cam ring 11.

By the way, while the working oil is acted upon by a resistance in accordance with a flow rate when it passes through each of the orifices 27, the flow path resistance acts in such a direction as to prevent rotation of the rotor 12 relative to the cam ring 11. Accordingly, the rotor 12 and the cam ring 11 are controlled by way of the working oil such that the difference in rotational speed therebetween may be reduced. For example, if the cam ring 11 tends to make a greater rotation than the rotor 12, then part of the rotating torque is transmitted to the rotor 12 by way of the working oil.

It is to be noted that when the power transmission apparatus 10 is operating, the working oil is used for lubrication of slidably contacting portions of the bearings 43 and 44, piston 89, rotor 12, vanes 17 and so on.

By such an operation of the power transmission apparatus 10 as described above, torque from the engine 1 is dispersively transmitted at a suitable ratio to the front wheels 8 and the rear wheels 4 so that the front and rear wheels 3 and 4 may normally be rotated substantially at an equal speed, thereby attaining a four wheel driving condition.

As a result, when the automobile is running, for example, in a normal condition and the amount of slip at the front wheels is small, the torque from the engine 1 is mainly transmitted to the front wheels 8 and little transmitted to the rear wheels 4. To the contrary, when the automobile is running on a road of a low friction such as a sandy road and the amount of slip at the front wheels 3 tends to increase, the torque is now transmitted dispersively at a suitable rate to the front wheels 3 and the rear wheels 4. Consequently, the slip at the front wheels 8 is actually restricted to a small amount. Accordingly, even on such a low friction road, the wheels will not slip significantly, and the automobile can run with certainty and in safety.

The reason why the power transmission apparatus 10 can be interposed in the propeller shaft 8 as described above is that the tank 30a for accommodating working oil in an enclosed condition therein is provided in an integral relationship with the power transmission apparatus 10 and accordingly the apparatus 10 can be formed as a single block. Consequently, the working oil can be used exclusively for the power transmission apparatus 10 and is not used for any other apparatus. Accordingly, it is advantageous in that deterioration of working oil can be prevented and the life of the apparatus can be improved.

On the other hand, the temperature of working oil in the inside of the power transmission apparatus 10 such as the tank 30a and the pump chambers 21, 22 and 23 exhibits a wide variation whether the apparatus 10 is operating or at rest, and besides the temperature is varied also by the temperature of the outside air. Such a temperature variation will cause a variation of the volume of the working oil, and when the temperature rises high, the working oil is expanded so that the pressure thereof tends to rise, hut on the contrary when the temperature becomes low, the working oil is contracted so that the pressure thereof tends to lower. In such an instance, the volume variation absorbing mechanism 14 will operate to absorb a variation of the volume of the working oil to adjust the pressure of the working oil within a substantially fixed range. In particular, when the working oil is expanded to raise the pressure thereof, the volume variation absorbing mechanism 14 operates so that the piston 39 is retracted to increase the volume of the cylinder 38, thereby allowing expansion of the working oil to control a rise of the pressure. On the contrary, when the working oil is contracted to lower the pressure thereof, the piston 39 is advanced to reduce the volume of the cylinder 38, thereby compensating for contraction of the working oil to control reduction of the pressure. Consequently, such a trouble that working oil may spout from a sealing portion or the like of the apparatus 10 when the temperature is high or the external air may be admitted into the apparatus from a sealing portion or the like of the apparatus when the temperature is low is eliminated, and the apparatus 10 will operate with certainty.

Particularly because the volume variation absorbing mechanism 14 is located near the axis of rotation of the rotor 12, it operates such that it may absorb a variation in volume of working oil caused by a variation in temperature without being influenced by a rise in pressure of the working oil at an outer peripheral location caused by centrifugal force during rotation of the power transmission apparatus 10 or it may reduce the volume of the cylinder 38 to cope with reduction in pressure at or near the axis of rotation of the rotor 12. Consequently, the pressure of the working oil is adjusted substantially within a predetermined range, and reduction in pressure of the working oil particularly at the location of the axis of rotation is controlled. As a result, such a trouble that the external air may be introduced into the apparatus from a sealing portion or the like of the apparatus due to reduction in pressure at or near the location of the axis of rotation caused by rotation of the apparatus 10 is eliminated, and the apparatus 10 will operate with more certainty.

The power transmission apparatus 10 of the embodiment described above also has an advantage that the cooling efficiency of working oil is high because the tank 30a is provided along the outer periphery of the apparatus 10.

Figure 4:
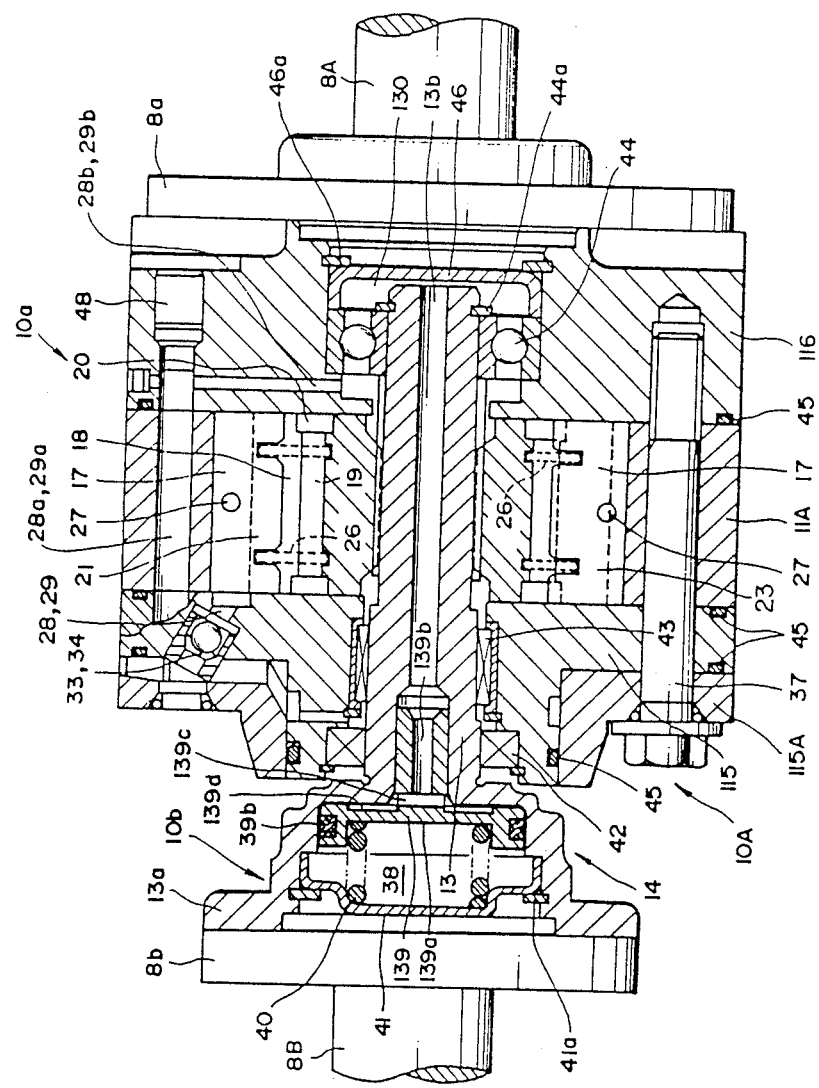
FIG. 4 is a vertical sectional view of a power transmission apparatus a second embodiment of the present invention.

Referring now to FIG. 4, there is shown a power transmission apparatus according to a second preferred embodiment of the present invention. In the power transmission apparatus 10a shown, a portion corresponding to the oil chamber 49 of the power transmission apparatus 10A of the first embodiment, that is, a gap defined by a shaft member 13 and a pair of end housings 115 and 116, makes a tank 130, and a cam ring 11A, the end housings 115 and 116 and a spacer 115A are not covered with such a cover member as the cover member 30. In order to establish communication between the tank 130 and pump chambers 21, 22 and 23 {only pump chambers 21 and 28 are shown in FIG. 4), oil path extensions 28a, 29a, 28b and 29b are perforated in the end housings 115 and 116 and cam ring 11A and connected to oil paths 28 and 29 in which check valves 33 and 34 are interposed, respectively.

A modified piston corresponding to the piston 39 in the preceding embodiment is denoted at 139 and has a recess 139a formed therein. The piston 139 further has oil paths 139b, 139c and 139d formed therein for supplying working oil to slidably contacting faces of the piston 189 and the shaft member 18 to lubricate such slidably contacting portions.

Since the remaining portions of the power transmission apparatus shown in FIG. 4 are constructed substantially in a similar manner to those of the power transmission apparatus shown in FIG. 1, overlapping description thereof is omitted herein to avoid redundancy.

The power transmission apparatus according to the second preferred embodiment of the present invention has such a construction as described above, and accordingly substantially similar effects to those of the first embodiment can be attained. The power transmission apparatus, however, is further advantageous in that the overall size can be further reduced.

Figure 5:
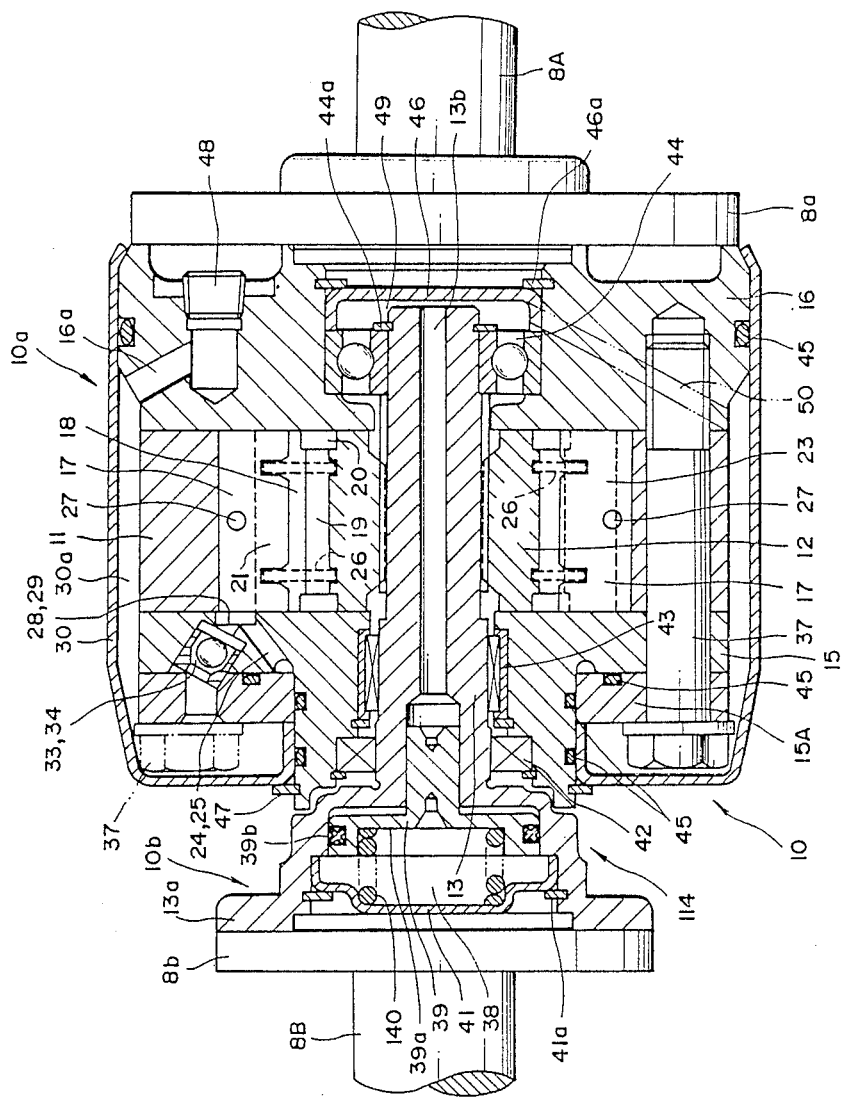
FIGS. 5 and 6 are similar views but showing third and fourth embodiments of the present invention, respectively.

Referring now to FIG. 5, there is shown a power transmission apparatus according to a third preferred embodiment of the present invention. The power transmission apparatus 10 shown has a substantially similar construction to that of the power transmission apparatus 10 of the first embodiment described hereinabove except for a volume variation absorbing mechanism 114 thereof.

In the volume variation absorbing mechanism 114, a coil spring 140 has such a natural condition as seen in FIG. 5 in which it does not bias a piston 39 to its most advanced position.

Figure 6:
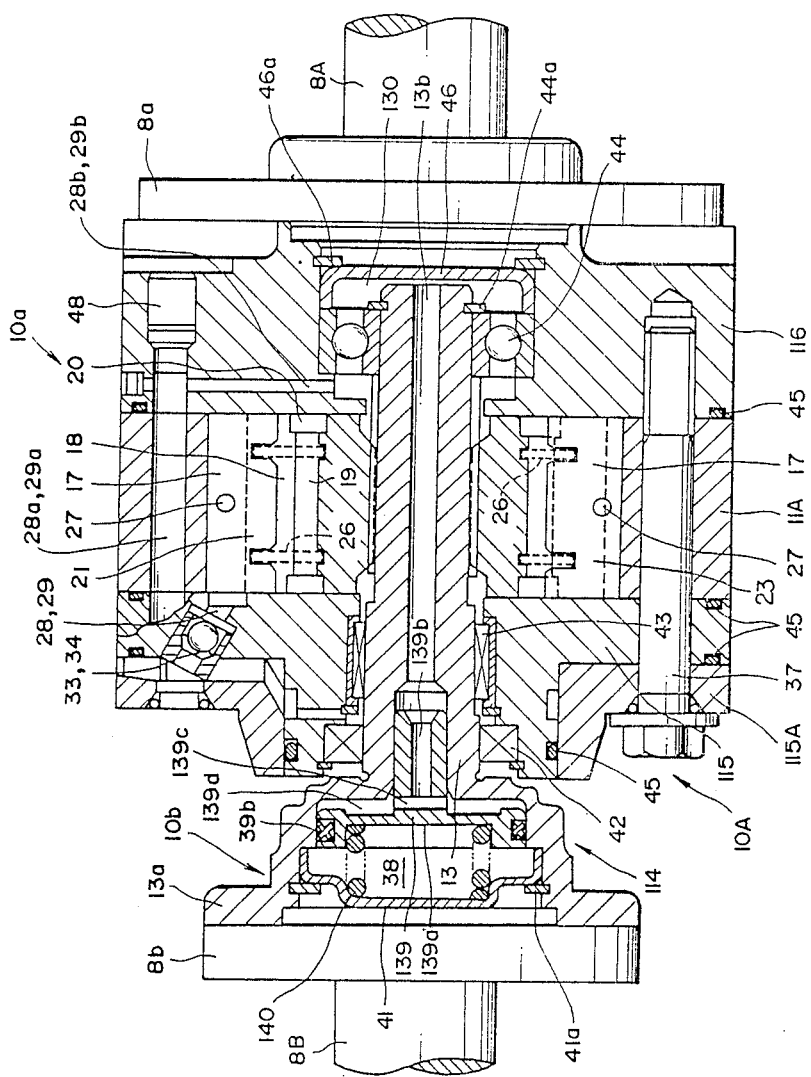

Accordingly, the piston 39 can slidably move freely within a predetermined range between its position shown in FIG. 6 and the most advanced position. Meanwhile, working oil is not specially pressurized and is supplied under the atmospheric pressure in the tank 30a.

Since the remaining portions of the power transmission apparatus shown in FIG. 5 are constructed substantially in a similar manner to those of the power transmission apparatus shown in FIG. 1, overlapping description thereof is omitted herein.

The power transmission apparatus according to the third preferred embodiment of the present invention has such a construction as described above, and accordingly, substantially similar effects to those of the first embodiment can be attained. However, since working oil is enclosed without being specially pressurized, the power transmission apparatus is additionally advantageous in that the load to a sealing portion or the like of the apparatus 10 is moderated, which contributes to improvement in durability of the apparatus 10.

Referring now to FIG. 6, there is shown a power transmission apparatus according to a fourth preferred embodiment of the present invention. The power transmission apparatus of the present embodiment has a substantially similar construction to that of the second embodiment described hereinabove except for a volume variation absorbing mechanism 114 thereof. However, the volume variation absorbing mechanism 114 has a similar construction to that of the third embodiment described above, and accordingly, description thereof is omitted herein.

While the power transmission apparatus of the fourth embodiment has such a construction as described just above and attains substantially similar effects to those of the second embodiment, particularly because working oil is enclosed without being specially pressurized, the power transmission apparatus is advantageous, similarly as in the third embodiment, in that the load to a sealing portion or the like of the apparatus is moderated, which contributes to improvement in durability of the apparatus 10A.

It is to be noted that the power transmission apparatus 10, 10A of any of the embodiments described hereinabove not only can be interposed in a shaft or between two shafts other than the propeller shaft 8 but also can be applied to various apparatus other than a four wheel drive apparatus for an automobile.

Further, while oil is used as working fluid in all of the embodiments described above, some other suitable fluid may be used as working oil.

What is claimed is:

1. A power transmission apparatus, comprising a vane pump type hydraulic transmission coupling mechanism including a cam ring connected to a first rotary shaft, said hydraulic transmission coupling mechanism further including a rotor connected to a second rotary shaft and accommodated for rotation in said cam ring to define a pump chamber therebetween, said hydraulic transmission coupling mechanism further including a plurality of vanes mounted on an outer peripheral wall of said rotor for slidably contacting with an inner peripheral wall of said cam ring to partition said pump chamber into a discharge side chamber and a suction side chamber, said pump chamber containing working fluid therein, said power transmission apparatus being designed to transmit driving force between said first and second rotary shafts in accordance with a pressure of the working fluid in said pump chamber which is produced in response to rotation of said first and second rotary shafts relative to each other, a tank provided in an integral relationship with said hydraulic transmission coupling mechanism for accommodating the working fluid in an enclosed condition therein, and a volume variation absorbing mechanism provided near an axis of rotation of said hydraulic transmission coupling mechanism for absorbing a variation in volume of the working fluid.

2. A power transmission apparatus as claimed in claim 1, wherein said volume variation absorbing mechanism includes a cylinder formed near a connecting portion of said second rotary shaft to said rotor and communicating with said tank, a piston fitted for sliding movement in said cylinder, and a spring for biasing said piston in a direction to decrease the volume of said cylinder.

3. A power transmission apparatus as claimed in claim 2, wherein a shaft member is connected at the axis of rotation of said rotor and has a flange formed at an open end portion thereof, and said flange is connected to said second rotary shaft while said cylinder is formed in said shaft member near said flange.

4. A power transmission apparatus as claimed in claim 3, wherein said shaft member extends through said rotor and has formed therein a path which establishes communication between said tank and a liquid-tight circumscribed spacing adjacent the other end portion of said shaft member remote from said cylinder and also between said cylinder and said liquid-tight circumscribed spacing.

* * * * *